United States Patent
Choi et al.

(10) Patent No.: US 9,680,840 B2
(45) Date of Patent: Jun. 13, 2017

(54) PASSWORD PROTECTED DEVICE UNLOCK BASED ON MOTION SIGNATURE AND PROXIMITY

(71) Applicant: Samsung Electronics Co., Ltd., Suwon-si, Gyeonggi-do (KR)

(72) Inventors: Sungkyu Choi, San Jose, CA (US); Sejin Choi, San Jose, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/793,600

(22) Filed: Jul. 7, 2015

(65) Prior Publication Data

US 2017/0012994 A1    Jan. 12, 2017

(51) Int. Cl.

| G06F 17/00 | (2006.01) |
|---|---|
| H04L 29/06 | (2006.01) |
| G06F 21/32 | (2013.01) |
| G06F 21/36 | (2013.01) |
| H04W 12/06 | (2009.01) |
| G06F 1/16 | (2006.01) |
| G06F 3/01 | (2006.01) |
| G06F 3/0346 | (2013.01) |
| G06F 3/0488 | (2013.01) |
| G09G 5/12 | (2006.01) |
| H04W 4/00 | (2009.01) |

(52) U.S. Cl.
CPC ............ *H04L 63/107* (2013.01); *G06F 1/163* (2013.01); *G06F 3/017* (2013.01); *G06F 3/0346* (2013.01); *G06F 3/04883* (2013.01); *G06F 21/32* (2013.01); *G06F 21/36* (2013.01); *G09G 5/12* (2013.01); *H04L 63/0853* (2013.01); *H04W 12/06* (2013.01); *H04W 4/008* (2013.01)

(58) Field of Classification Search
CPC ..... H04L 63/107; H04L 63/0853; G09G 5/12; H04W 12/06; G06F 1/163; G06F 3/017
USPC .......................................................... 726/17
See application file for complete search history.

(56) References Cited

U.S. PATENT DOCUMENTS

| 2015/0022438 A1* | 1/2015 | Hong .................. H04M 1/7253 |
|---|---|---|
| | | 345/156 |
| 2016/0050308 A1* | 2/2016 | Liu .................... H04W 52/0209 |
| | | 455/411 |

FOREIGN PATENT DOCUMENTS

| CN | 104283876 | 1/2015 |
|---|---|---|
| EP | 2882174 A2 | 6/2015 |
| EP | 3001637 A1 | 3/2016 |
| JP | 2010213152 | 9/2010 |

(Continued)

OTHER PUBLICATIONS

Extended European Search Report dated Sep. 28, 2016 in connection with European Application No. 16169678.6, 7 pages.

*Primary Examiner* — Mohammad W Reza

(57) ABSTRACT

A method is provided for the authentication of an electronic device using an authenticated wearable device. The method includes wirelessly connecting a wearable device and an electronic device. The method also includes detecting a movement on a touchscreen of the electronic device. The method also includes detecting a movement of the wearable device. The method also includes comparing the movement on the touchscreen and the movement of the wearable device. The method also includes unlocking the electronic device when the movement on the touchscreen matches the movement of the wearable device.

20 Claims, 7 Drawing Sheets

(56) References Cited

FOREIGN PATENT DOCUMENTS

WO           2014153528 A2    9/2014
WO    WO 2015065494 A1 *   5/2015   ............ H04W 4/008

* cited by examiner

PASSWORD PROTECTED DEVICE UNLOCK BASED ON MOTION SIGNATURE AND PROXIMITY

TECHNICAL FIELD

The present application relates generally to user authentication and, more specifically, to a method and apparatus for password protected device unlock based on motion signature and proximity.

BACKGROUND

The current password based unlocking methods requires inconvenient manual password input every time, which is vulnerable because strangers can steal your pattern or passcode while you draw the pattern or type in passcode. An automatic unlocking method to resolve this problem could greatly improve user experience.

Additionally, Prevalence of wearable devices is increasing. Wearable devices include many features like proximity sensor, heart rate sensor, accelerometer, gyroscope, BLUETOOTH connectivity and so on. Using proximity sensor to automatically unlock a device is not secure enough since the device could be stolen and still be used near the user. It requires more complex combination of sensors to effectively unlock a device with security in mind in addition to convenience.

SUMMARY

A first embodiment provides a method capable of authenticating a user. The method includes wirelessly connecting a wearable device and an electronic device. The method also includes detecting a movement on a touchscreen of the electronic device. The method also includes detecting a movement of the wearable device. The movement on the touchscreen and the movement of the wearable device are compared. The electronic device is unlocked when the movement on the touchscreen matches the movement of the wearable device.

A second embodiment provides a method for authenticating a user. The method includes wirelessly connecting a wearable device and an electronic device. The method also includes detecting a movement of the electronic device. The method also includes detecting a movement of the wearable device. The method further includes comparing the movement of the electronic device and the movement of the wearable device. Additionally, the method also includes unlocking the electronic device when the movement of the electronic device matches the movement of the wearable device.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

Embodiments of the present disclosure provide an unnoticed unlocking method using a wearable device. The wearable device can be used as a secure authenticator to identify a user using the natural hand moving pattern detected by wearable device and touch screen device to unlock. The hand moving pattern doesn't require saving on the wearable device or other device, but the system determines whether the two patterns are identical.

For a small device such as a mobile phone, the moving signature pattern is checked between the hand movement and the mobile movement grabbed by the hand. For example, naturally lifting the phone from pocket for use. For a touch screen such as PC screen or TV, the moving signature pattern is checked between the hand movement and the trajectory of random lines the user draw on the screen.

Because no specific hand motion ends are required, there is not a login authentication that can be detected by anybody. Embodiments of the present disclosure provide more convenient unlocking methods by simply lifting a phone, mobile phone, or tablet or drawing a random line on the touch screen of a PC monitor, TV, etc.

Figure 1:
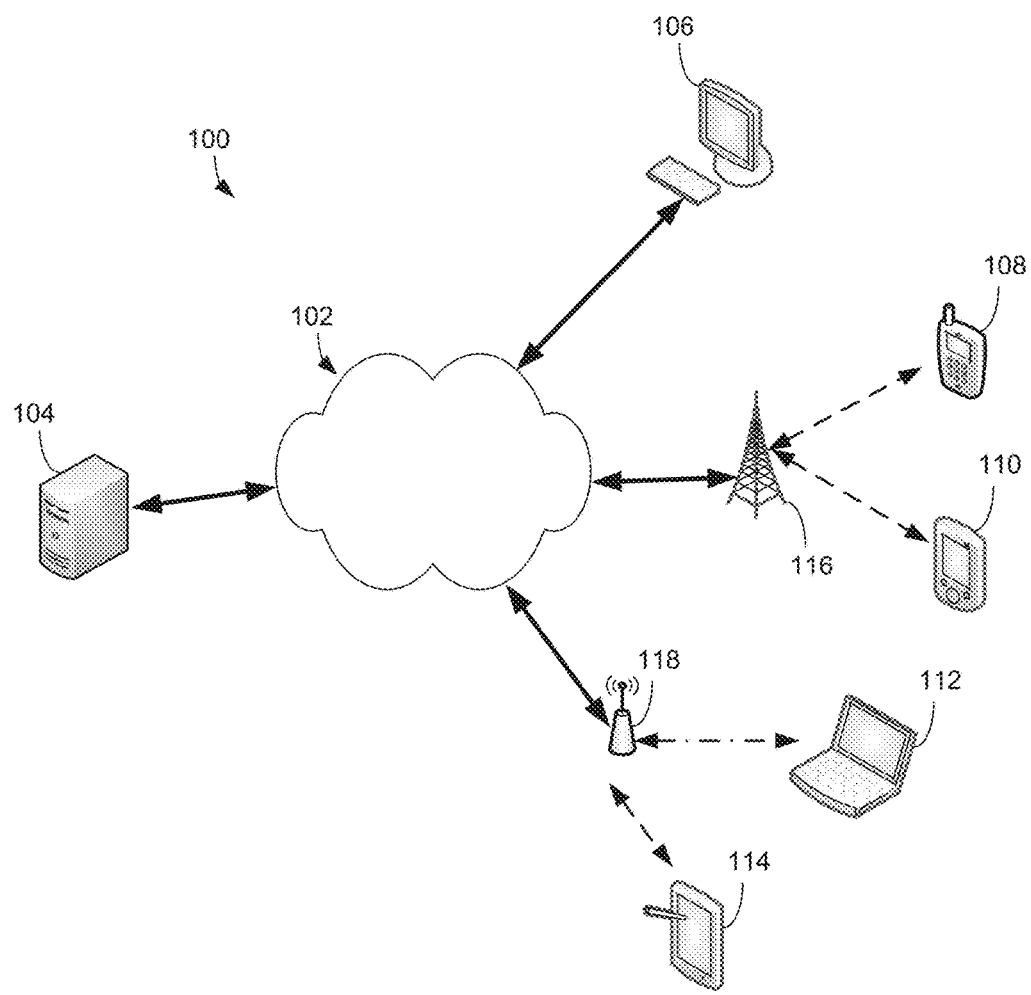
FIG. 1 illustrates an example computing system according to this disclosure.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various client devices 106-114. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or processing device that interacts with at least one server or other computing device(s) over the network 102. In this example, the client devices 106-114 include a desktop computer 106, a mobile telephone or smartphone 108, a personal digital assistant (PDA) 110, a laptop computer 112, and a tablet computer 114. However, any other or additional client devices could be used in the computing system 100.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
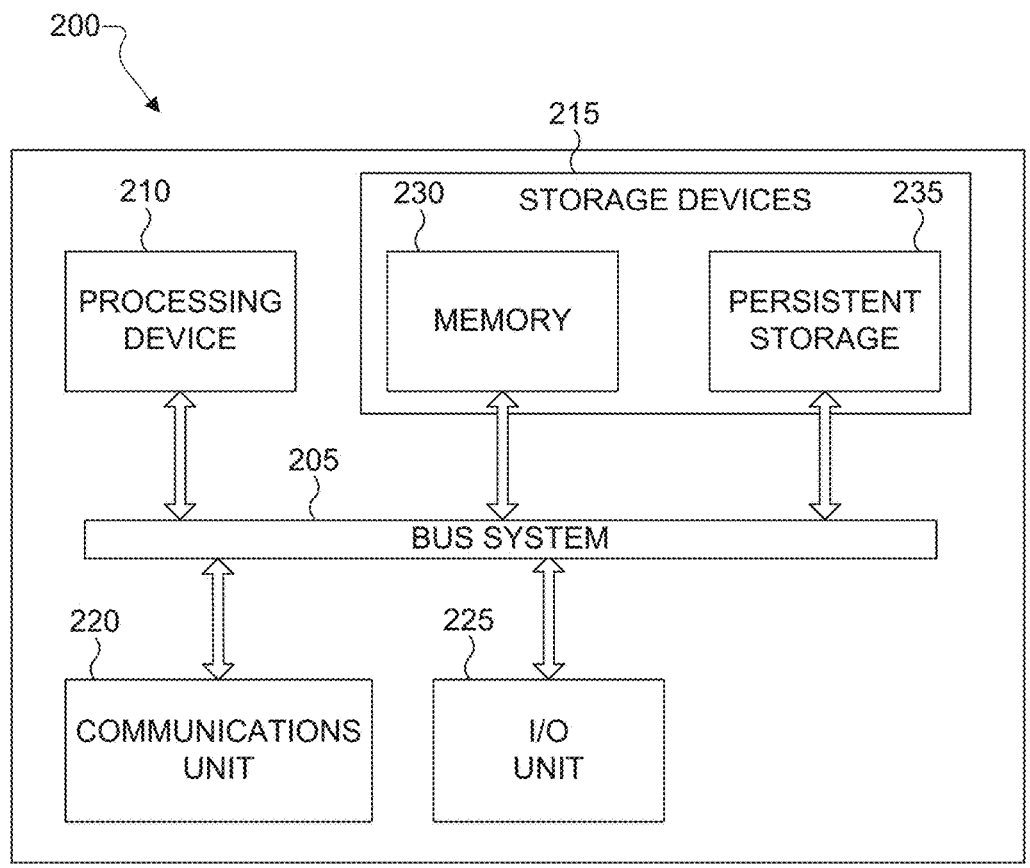
FIGS. 2 and 3 illustrate example devices in a computing system according to this disclosure.
Figure 3:
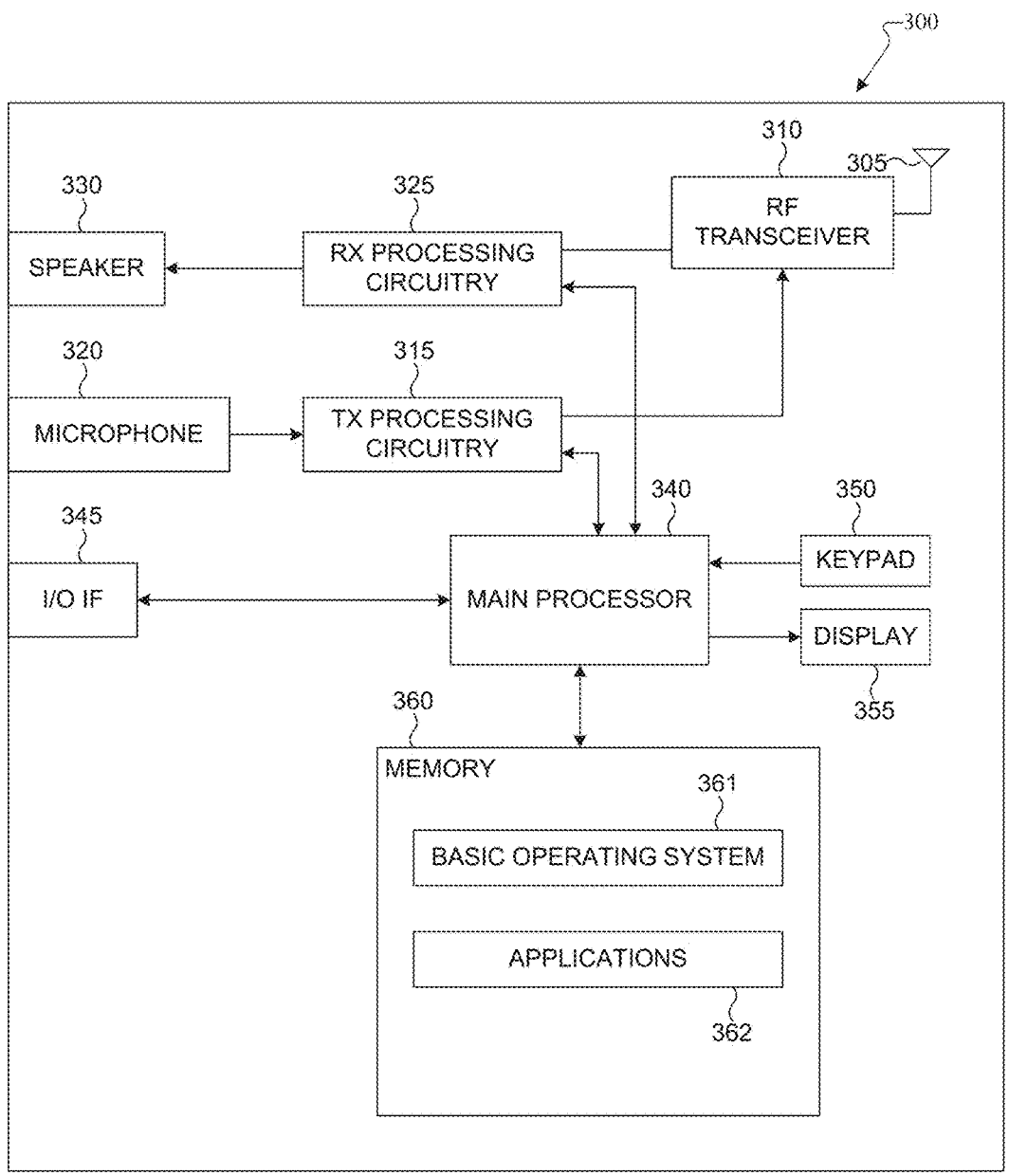

FIGS. 2 and 3 illustrate example devices in a computing system according to this disclosure. In particular, FIG. 2 illustrates an example server 200, and FIG. 3 illustrates an example client device 300. The server 200 could represent the server 104 in FIG. 1, and the client device 300 could represent one or more of the client devices 106-114 in FIG. 1.

As shown in FIG. 2, the server 200 includes a bus system 205, which supports communication between at least one processing device 210, at least one storage device 215, at least one communications unit 220, and at least one input/output (I/O) unit 225.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discreet circuitry. A The processing device 210 is configured to perform operations for unlocking an electronic device with an authenticated wearable device.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Note that while FIG. 2 is described as representing the server 104 of FIG. 1, the same or similar structure could be used in one or more of the client devices 106-114. For example, a laptop or desktop computer could have the same or similar structure as that shown in FIG. 2.

As shown in FIG. 3, the client device 300 includes an antenna 305, a radio frequency (RF) transceiver 310, transmit (TX) processing circuitry 315, a microphone 320, and receive (RX) processing circuitry 325. The client device 300 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by another component in a system. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the client device 300. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for unlocking an electronic device with an authenticated wearable device. The main processor 340 can move data into or out of the memory 360 as required by an executing process. In some embodiments, the main processor 340 is configured to execute the applications 362 based on the OS program 361 or in response to signals received from external devices or an operator. The main processor 340 is also coupled to the I/O interface 345, which provides the client device 300 with the ability to connect to other devices such as laptop computers and handheld computers. The I/O interface 345 is the communication path between these accessories and the main controller 340.

The main processor 340 is also coupled to the keypad 350 and the display unit 355. The operator of the client device 300 can use the keypad 350 to enter data into the client device 300. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIGS. 2 and 3 illustrate examples of devices in a computing system, various changes may be made to FIGS. 2 and 3. For example, various components in FIGS. 2 and 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the client device 300 configured as a mobile telephone or smartphone, client devices could be configured to operate as other types of mobile or stationary devices. In addition, as with computing and communication networks, client devices and servers can come in a wide variety of configurations, and FIGS. 2 and 3 do not limit this disclosure to any particular client device or server.

Figure 4:
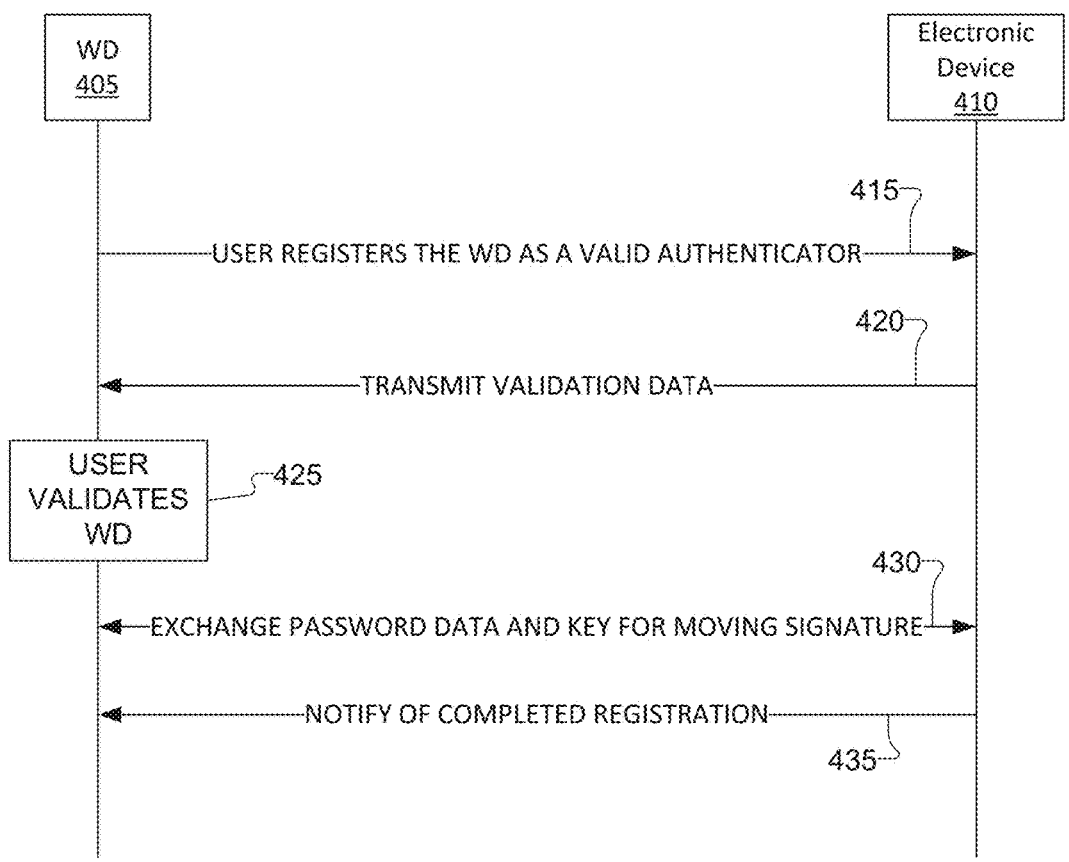
FIG. 4 is a flow diagram for registering a wearable device with the electronic device according to this disclosure.

FIG. 4 is a flow diagram for registering a wearable device 405 with the electronic device 410 according to various embodiments of the disclosure. While the signal diagram depicts a series of sequential signals, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, a wearable device and an electronic device.

In operation 415, the user registers the wearable device 405 as a valid authenticator of the electronic device 410. The registration includes identifying the wearable device 405. In certain embodiments, the user establishing authentication settings on the electronic device 410 including, but not limited to, setting a password, setting a connection type, or setting a proximity for the authentication of the wearable device 405.

In operation 420, the electronic device 410 transmits the validation data to the wearable device 405. In operation 425, the user validates the wearable device 425. The wearable device 405 displays the authentication information to the user for confirmation. In certain embodiments, the wearable device 405 requires the user to enter the password into an interface for validation.

In operation 430, the wearable device 405 and the electronic device 410 exchange password data and key for the moving signature. In operation 435, the electronic device 410 notifies the wearable device 405 that the registration is complete. Once the registration is complete, the wearable device 405 is linked to the electronic device 410.

Figure 5A:
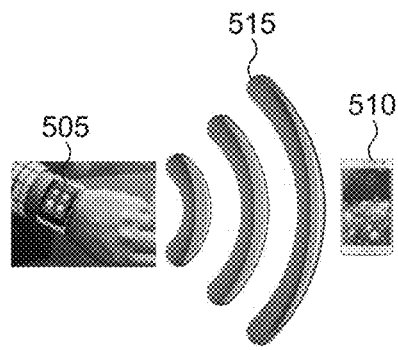
FIGS. 5A, 5B and 5C illustrate using a wearable device to unlock a portable electronic device according to this disclosure.
Figure 5B:
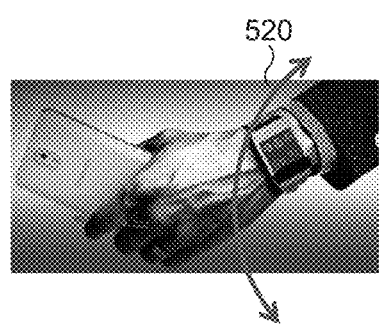
Figure 5C:
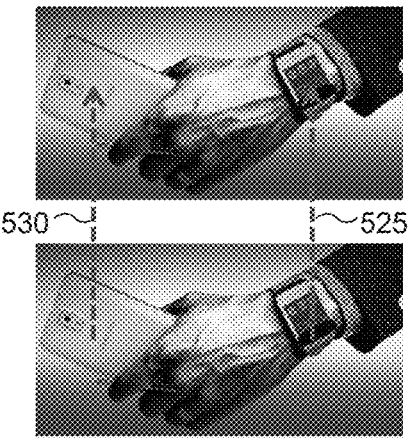

FIGS. 5A-5C illustrate using a wearable device 505 to unlock a portable electronic device 510 according to various embodiments of the disclosure. The embodiments shown in FIGS. 5A, 5B and 5C are for illustration only. Other embodiments could be used without departing from the scope of the present disclosure.

In FIG. 5A, the wearable device 505 detects a portable electronic device 510 is within proximity. The portable electronic device 510 also detects the wearable device 505 is within proximity 515. The proximity 515 of the devices is determined during registration and set based on the connection type.

In FIG. 5B, once the wearable device 505 is determined to be within proximity of the portable electronic device 510, the wearable device 505 and the portable electronic device 510 detect a movement 520 from one or more sensors including, but not limited to, embedded acceleration sensors and gyroscopes. The movement is original and cannot be previously found in the memory of the portable electronic device 510 or the wearable device 505.

Figure 6:
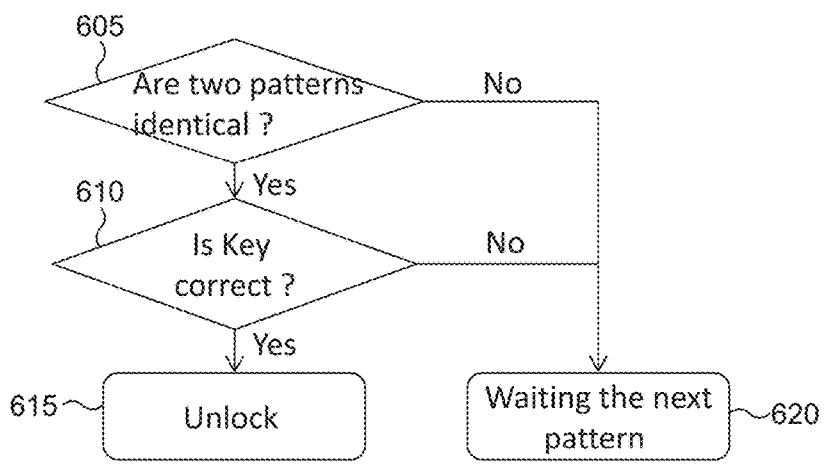
FIG. 6 illustrates a flow diagram for unlocking a portable electronic device using a common pattern with a wearable device according to this disclosure.

In FIG. 5C, the movement 520 of the wearable device 525 is translated into a moving pattern 525. The movement 520 of the portable electronic device 510 is also translated into a moving pattern 530. The moving patterns 525 and 530 encompass the translation and rotation of the wearable device 505 and the portable electronic device 510 over a period of time. The moving patterns are determined using an acceleration in an x-direction, a y-direction, and a z-direction using the acceleration sensor of the respective devices and are oriented using a gyroscope of the respective devices FIG. 6 illustrates a flow diagram for unlocking a portable electronic device 510 using a common pattern with a wearable device 505 according to various embodiments of the disclosure. While the flow chart depicts a series of steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, an electronic device.

In operation 605, after receiving the moving pattern and the authentication information from the wearable device 505, the portable electronic device 510 determines whether the moving patterns 525 and 530 are identical. The portable electronic device 510 compares the translation and rotation against the time of the moving patterns 525 and 530 to determine whether they were created using the same movement 520. With translation movements, the moving patterns experience the same changes based on the user holding the phone. In certain embodiments, the portable electronic device 510 measures the rotation over time because the change in distance is different depending on the distance of the wearable device 505 and portable electronic device 510 from the point of rotation.

In operation 610, once the portable electronic device 510 determines the two patterns are identical, the portable electronic device 510 determines whether the authentication key is correct. When the moving patterns are identical and the authentication key is verified, the portable electronic device 510 unlocks in operation 615. When either the moving patterns are determined to not be identical or the authentication key is not verified, the portable electronic device 510 remains locked and waits for the next pattern entered in operation 620.

Figure 7A:
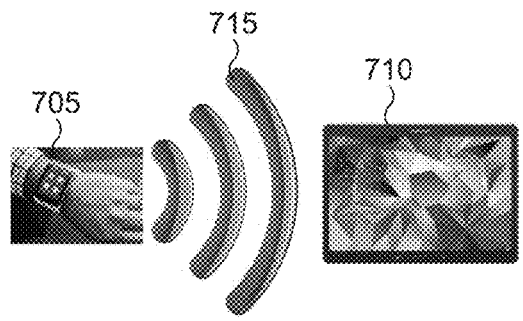
FIGS. 7A, 7B and 7C illustrate using a wearable device to unlock an electronic device according to this disclosure.
Figure 7C:
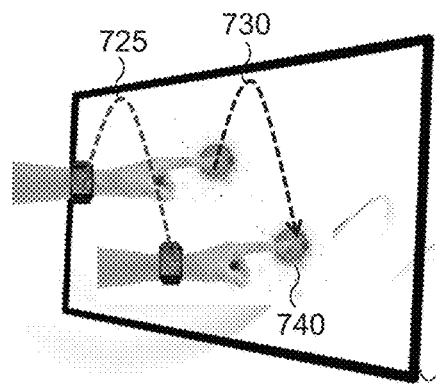
Figure 7B:
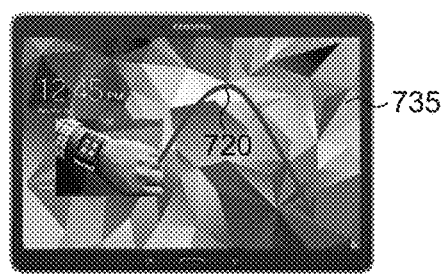

FIGS. 7A-7C illustrate using a wearable device to unlock an electronic device according to various embodiments of the disclosure. The embodiments shown in FIGS. 7A-7C are for illustration only. Other embodiments could be used without departing from the scope of the present disclosure.

In FIG. 7A, the wearable device 705 detects an electronic device 710 is within proximity. The electronic device 710 also detects the wearable device 705 is within proximity 715. The proximity 715 of the devices is determined during registration and set based on the connection type.

In FIG. 7B, once the wearable device 705 is determined to be within proximity of the electronic device 710, the wearable device 705 detects a movement 720 from one or more sensors including, but not limited to, embedded acceleration sensors and gyroscopes. The electronic device 710 receives an input 740 on a touchscreen 735 corresponding to the movement 720. The movement is original and cannot be previously found in the memory of the electronic device 710 or the wearable device 705.

In FIG. 7C, the movement 720 of the wearable device 725 is translated into a moving pattern 725. The movement 720 on the touchscreen 735 of the electronic device 710 is also translated into a moving pattern 730. The moving patterns 725 and 730 encompass the translation of the wearable device 705 and input 740 from the user over a period of time. The moving pattern of the wearable device 705 is determined using acceleration in an x-direction, a y-direction, and a z-direction using the acceleration sensor of the respective devices and are oriented using a gyroscope of the respective devices.

Figure 8:
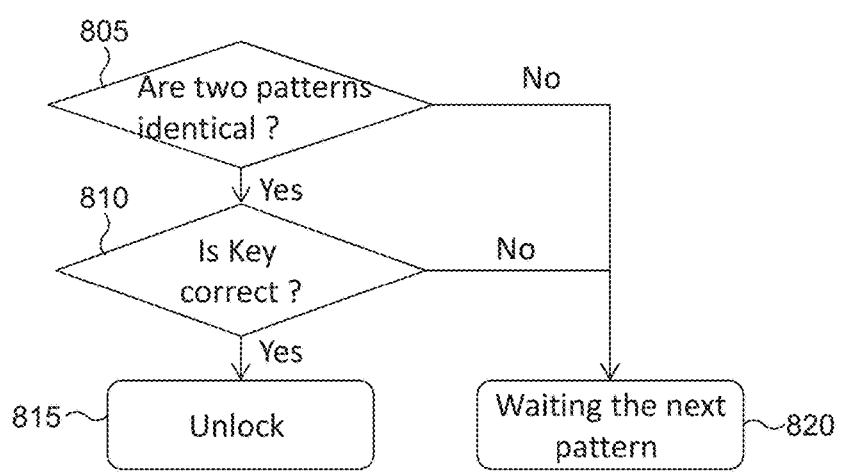
FIG. 8 illustrates a flow diagram for unlocking an electronic device using a common pattern with a wearable device according to this disclosure.

FIG. 8 illustrates a flow diagram for unlocking an electronic device 710 using a common pattern with a wearable device 705 according to various embodiments of the disclosure. While the flow chart depicts a series of steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, an electronic device.

In operation 805, after receiving the moving pattern and the authentication information from the wearable device 705, the electronic device 710 determines whether the moving patterns 725 and 730 are identical. The electronic device 710 compares the translation and rotation against the time of the moving patterns 725 and 730 to determine whether they were created using the same movement 720.

In operation 810, once the electronic device 710 determines the two patterns are identical, the electronic device 710 determines whether the authentication key is correct. When the moving patterns are identical and the authentication key is verified, the electronic device 710 unlocks in operation 815. When either the moving patterns are determined to not be identical or the authentication key is not verified, the electronic device 710 remains locked and waits for the next pattern entered in operation 820.

Figure 9:
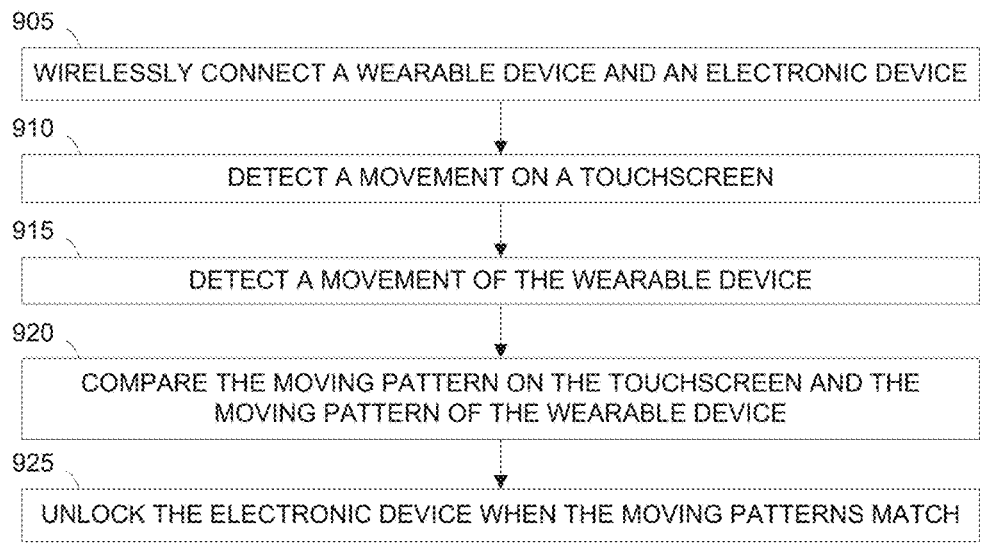
FIG. 9 is a method for unlocking a portable electronic device using a wearable device according to this disclosure.

FIG. 9 is a method for unlocking an electronic device using a wearable device according to various embodiments of the disclosure. While the flow chart depicts a series of steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, an electronic device.

In operation 905, a wearable device 405 and an electronic device 410 wirelessly connect. The wireless connection can be made through any means known, for example, using BLUETOOTH or any near field communication (NFC). The wireless connection includes authenticating the wearable device 405, described above in context of FIG. 4.

In certain embodiments, when the user removes the wearable device 405, the password is required to be entered when putting it back on to authenticate the user of the wearable device 405. The password can be a combination of letters and symbols using a keyboard, a PIN code, a special design, or any other form of inputting a password to verify a user. The wearable device 405 uses the sensors to determine when the wearable device 405 is removed.

In operation 910, a movement is detected on the touchscreen of the electronic device 410. In operation 915, a movement is detected from the wearable device 405. The movement detected in the wearable device 405 and the password are encrypted and sent to the electronic device 410.

In operation 920, the electronic device 410 compares the moving pattern on the touchscreen to the moving pattern of the wearable device 410. In operation 925, the electronic device 410 unlocks when the moving patterns match.

Figure 10:
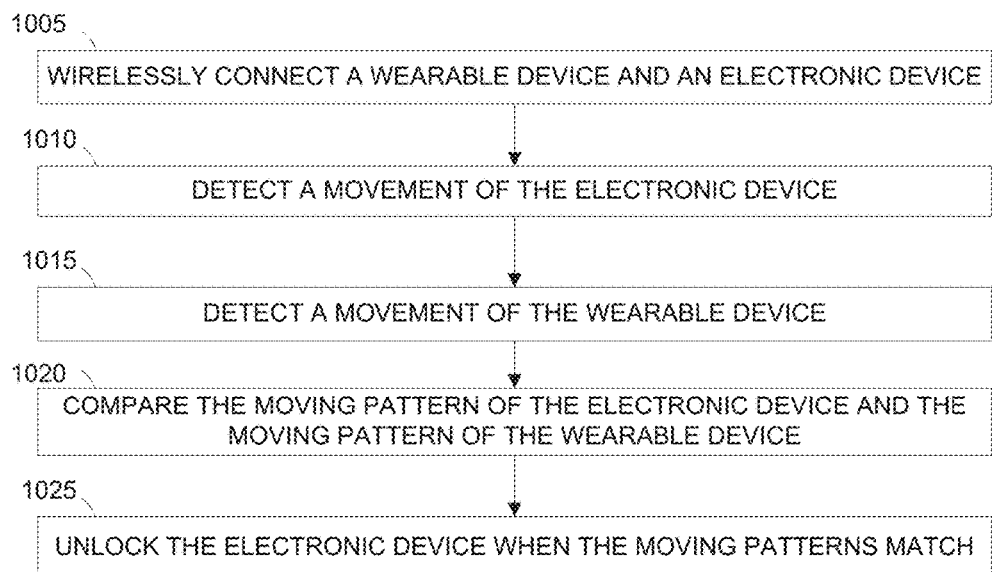
FIG. 10 is a method for unlocking an electronic device using a wearable device according to this disclosure.

FIG. 10 is a method for unlocking an electronic device using a wearable device according to various embodiments of the disclosure. While the flow chart depicts a series of steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, an electronic system.

In operation 1005, a wearable device 405 and an electronic device 410 wirelessly connect. The wireless connection can be made through any means known, for example, using BLUETOOTH or near field communication (NFC). The wireless connection includes authenticating the wearable device 405, described above in context of FIG. 4.

In certain embodiments, when the user removes the wearable device 405, the password is required to be entered when putting it back on to authenticate the user of the wearable device 405. The password can be a combination of letters and symbols using a keyboard, a PIN code, a special design, or any other form of inputting a password to verify a user. The wearable device 405 uses the sensors to determine when the wearable device 405 is removed.

In operation 1010, a movement is detected from the electronic device 410. In operation 1015, a movement is detected from the wearable device 405. The movement detected in the wearable device 405 and the password are encrypted and sent to the electronic device 410.

In operation 1020, the electronic device 410 compares the moving pattern on the touchscreen to the moving pattern of the wearable device 410. In operation 1025, the electronic device 410 unlocks when the moving patterns match.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for authenticating a user, the method comprising:
    wirelessly connecting a wearable device and an electronic device;
    detecting a movement on a touchscreen of the electronic device;
    detecting a movement of the wearable device;
    comparing the movement on the touchscreen and the movement of the wearable device; and
    unlocking the electronic device when the movement on the touchscreen matches the movement of the wearable device.

2. The method of claim 1, wherein the movement on the touchscreen is not saved.

3. The method of claim 1, further comprising sending the movement of the wearable device with an encrypted password to the electronic device.

4. The method of claim 1, wherein detecting the movement of the wearable device comprises:
    measuring an orientation using a gyroscope of the wearable device; and
    measuring an acceleration in an x-direction, an acceleration in a y-direction, and an acceleration in a z-direction using an accelerometer of the wearable device.

5. The method of claim 4, further comprising:
    determining the movement of the wearable device based on the accelerations and the orientation of the wearable device.

6. The method of claim 1, further comprising:
    entering a user authentication on the wearable device for a user; and
    validating the user authentication for the user.

7. The method of claim 6, wherein the user authentication remains active on the wearable device until the wearable device is removed by the user.

8. The method of claim 1, further comprising:
    monitoring a proximity of the wearable device to the electronic device; and
    remaining in a locked state while the wearable device is not within the proximity of the electronic device.

9. The method of claim 1, further comprising a user registering the wearable device as a valid authenticator for the electronic device.

10. The method of claim 9, wherein the user registering the wearable device comprises registering a pin code as a user authentication for the wearable device.

11. An electronic device comprising:
    a transceiver configured to connect to a wearable device;
    a touchscreen;
    processing circuitry configured to:
        detect a movement on the touchscreen of the electronic device;
        detect a movement of the wearable device;
        compare the movement on the touchscreen and the movement of the wearable device; and
        unlock the electronic device when the movement on the touchscreen matches the movement of the wearable device.

12. The electronic device of claim 11, wherein the movement on the touchscreen is not saved.

13. The electronic device of claim 11, wherein the processing circuitry is further configured to receive the movement of the wearable device with an encrypted password to the electronic device.

14. The electronic device of claim 11, wherein the processing circuitry is configured to detect the movement of the wearable device by:
    receiving a measurement of an orientation using a gyroscope of the wearable device; and
    receiving a measurement of an acceleration in an x-direction, an acceleration in a y-direction, and an acceleration in a z-direction using an accelerometer of the wearable device.

15. The electronic device of claim 14, wherein the processing circuitry is configured to determine the movement of the wearable device based on the accelerations and the orientation of the wearable device.

16. The electronic device of claim 11, wherein the transceiver receives a user authentication entered on the wearable device for a user; and
    the processing circuitry is configured to validate the user authentication for the user.

17. The electronic device of claim 16, wherein the user authentication remains active on the wearable device until the wearable device is removed by the user.

18. The electronic device of claim 11, wherein the processing circuitry is further configured to:
    monitor a proximity of the wearable device to the electronic device; and
    remain in a locked state while the wearable device is not within the proximity of the electronic device.

19. The electronic device of claim 11, wherein the wearable device is registered as a valid authenticator for the electronic device.

20. The electronic device of claim 19, wherein the wearable device is registered as the valid authenticator for the electronic device by registering a pin code as a user authentication for the wearable device.

* * * * *